United States Patent
Fuzioka

(10) Patent No.: US 9,343,821 B2
(45) Date of Patent: May 17, 2016

(54) TERMINAL WATERPROOFING STRUCTURE OF WIRE HARNESS

(75) Inventor: Ryo Fuzioka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 18 days.

(21) Appl. No.: 14/239,673

(22) PCT Filed: Feb. 27, 2012

(86) PCT No.: PCT/JP2012/054739
§ 371 (c)(1),
(2), (4) Date: Feb. 19, 2014

(87) PCT Pub. No.: WO2013/042386
PCT Pub. Date: Mar. 28, 2013

(65) Prior Publication Data
US 2014/0190744 A1    Jul. 10, 2014

(30) Foreign Application Priority Data
Sep. 21, 2011   (JP) ................................ 2011-206174

(51) Int. Cl.
*H01R 24/38*   (2011.01)
*H01R 4/20*    (2006.01)
(Continued)

(52) U.S. Cl.
CPC ............. *H01R 4/20* (2013.01); *B60R 16/0222* (2013.01); *H01B 7/2825* (2013.01); *H02G 3/088* (2013.01); *H02G 3/32* (2013.01)

(58) Field of Classification Search
CPC ............................ H02G 15/04; H02G 15/068
USPC ................ 174/74 R, 72 A, 75 C; 439/98, 610
See application file for complete search history.

(56) References Cited

U.S. PATENT DOCUMENTS 4,693,323 A * 9/1987 Owensby ...................... 174/359
4,786,757 A * 11/1988 Owensby et al. ............. 174/359
(Continued)

FOREIGN PATENT DOCUMENTS

DE         103 54 288 A1    6/2004
JP      A-2002-281654       9/2002
(Continued)

OTHER PUBLICATIONS

May 22, 2012 International Search Report issued in International Patent Application No. PCT/JP2012/054739.
(Continued)

*Primary Examiner* — Chau N Nguyen
(74) *Attorney, Agent, or Firm* — Oliff PLC

(57) ABSTRACT

A terminal waterproofing structure for a wire harness is provided, including a front end side of a tubular braided shielding member covering the wire harness overlaid on a tubular part of a shield shell, and fixed by crimping with a first crimp ring, and a tubular grommet made from an elastic member externally fitted to the tubular part of the shield shell that projects beyond a front end of the tubular braided shielding member while covering the section of the tubular braided shielding member that is fixed. The front end abuts on a flange part and the outer periphery of the grommet on the front end side is fixed by crimping with a second crimp ring. An annular sealing rib protrudes from the inner periphery of the grommet and a recess into which the annular sealing rib is press-fit is provided on the outer periphery.

4 Claims, 3 Drawing Sheets

(51) Int. Cl.
*H02G 3/32* (2006.01)
*H02G 3/08* (2006.01)
*B60R 16/02* (2006.01)
*H01B 7/282* (2006.01)

(56) References Cited

U.S. PATENT DOCUMENTS

| | | | | |
|---|---|---|---|---|
| 6,143,986 | A | * 11/2000 | Anderson et al. | 174/72 A |
| 7,041,907 | B2 | * 5/2006 | Miyazaki | 174/72 A |
| 7,687,714 | B2 | * 3/2010 | Deterre et al. | 174/72 R |
| 2005/0136738 | A1 | 6/2005 | Wada et al. | |
| 2007/0082534 | A1 | 4/2007 | Wada et al. | |

FOREIGN PATENT DOCUMENTS

| | | |
|---|---|---|
| JP | A-2005-317485 | 11/2005 |
| JP | A-2010-166756 | 7/2010 |
| JP | 2010-215010 | 9/2010 |
| JP | A-2010-215010 | 9/2010 |

OTHER PUBLICATIONS

Feb. 12, 2016 Office Action issued in German Patent Application No. 11 2012 003 924.6.

* cited by examiner

TERMINAL WATERPROOFING STRUCTURE OF WIRE HARNESS

This application is the national phase of PCT International Application No. PCT/JP2012/054739 that has an International filing date of Feb. 27, 2012 and designated the United States of America and claims priority to Japanese Patent App. No. JP 2011-206174 that was filed on Sep. 21, 2011. The disclosure of the prior applications is hereby incorporated by reference herein in their entirety.

BACKGROUND

A wire harness, which is constituted by high-voltage electrical power lines and routed between devices of a hybrid car or an electric car, such as between a battery and an inverter, or the inverter and a motor, is often routed under floor on the lower surface of a floor panel of the car. This wire harness to be routed under floor needs to be waterproof and protected and shielded from flying stones or the like, and therefore a group of electric cables constituting the wire harness is inserted into an armoring material constituted by, for example, a metal pipe and the metal pipe is arranged and fixed on the lower surface of the floor panel (see, for example, JP2010-215010A).

Although there is a case where both end portions of the wire harness inserted into the metal pipe are drawn out from the metal pipe and directly connected to connection counterpart devices, in many cases generally, the end portions of the wire harness are inserted into flexible armoring materials, such as corrugated tubes, that are connected to terminals of the metal pipe, and are routed to the connection counterpart devices arranged in an engine compartment and a rear portion of the vehicle interior.

A grommet 111 as shown in, for example, FIGS. 3(A) and 3(B) is attached to a terminal of a wire harness 100 to be connected to a connection counterpart device, in order to waterproof the terminal of the wire harness.

Specifically, a front end side of a tubular braided shielding member 101, which covers the wire harness 100 constituted by a plurality of high-voltage electrical power lines W, is overlaid on a tubular part 116 of a metallic shield shell 115 that is to be attached to a case of a connection counterpart device 120, and is fixed by crimping with a first crimp ring 113. Then a large diameter tubular part 111a, which is on one end side of the grommet 111, is externally fitted to the tubular part 116 of the shield shell 115 so as to cover the section of the tubular braided shielding member 101 that is fixed by crimping, and the outer periphery of the large diameter tubular part 111a on the front end side is fixed by crimping with a second crimp ring 114. Also, a small diameter tubular part 111b, which is on the other end side of the grommet 111, is externally fitted to a terminal of an armoring material 110 such as a corrugated tube from which the wire harness 100 is drawn out, and is tightly fixed by winding a tape (T) or the like.

Because the tubular part 116 of the shield shell 115 often has a generally ellipsoidal or oval shape in cross-section, it is difficult to apply an uniform pressure even when the large diameter tubular part 111a of the grommet 111 overlaid on the tubular part 116 is fixed by crimping with the second crimp ring 114, thus hardly improving the sealing performance. Accordingly, as shown in FIG. 3(B), a plurality of annular lips 112 protrude from the inner periphery of the large diameter tubular part 111 a beneath the second crimp ring 114, and the lips 112 are configured to be pressed against the outer periphery of the tubular part 116 of the shield shell 115, thereby, together with the fixation of the large diameter tubular part 111a by crimping with the second crimp ring 114, achieving an improved sealing performance.

SUMMARY

Technical Problem

However, in the case where the grommet 111 including the lips 112—which are provided on the inner periphery of the large diameter tubular part 111a beneath the second crimp ring 114—is used to waterproof a terminal of the wire harness 100, the lips 112—to which the pressing force of the crimp ring 114 is directly applied—are likely to thermally deform if the grommet 111 is exposed to a high temperature condition for a long period of time. It is difficult for the lips 112, if thermally deformed, to return to the original shape even when the inner pressure of the grommet and the pressing force of the second crimp ring 114 are reduced, and thus a gap may be caused between the tubular part 116 and the lips 112, resulting in a deterioration in the sealing performance.

Solution to Problem

It is an object herein to waterproof a wire harness terminal without deteriorating the sealing performance of a grommet even when the grommet is exposed to a high temperature condition for a long period of time.

In order to solve the above-described problem, a terminal waterproofing structure is provided for a wire harness to be routed in an electric car or a hybrid car, the wire harness being constituted by a plurality of high-voltage electrical power lines, wherein a front end side of a tubular braided shielding member covering the wire harness is overlaid on a tubular part of a shield shell and is fixed by crimping with a first crimp ring, the shield shell having a flange part protruding from the front end side of the tubular part, a tubular grommet made from an elastic member is externally fitted to the tubular part of the shield shell that projects beyond a front end of the tubular braided shielding member while covering the portion of the tubular braided shielding member that is fixed by crimping, a front end of the grommet abuts on the flange part of the shield shell, and the outer periphery of the grommet on the front end side is fixed by crimping with a second crimp ring, between the fixation position with the second crimp ring and the fixation position with the first crimp ring, an annular sealing rib protrudes from the inner periphery of the grommet and a recess into which the annular sealing rib is press-fit is provided on the outer periphery of the tubular part of the shield shell, and the second crimp ring, the annular sealing rib, and the first crimp ring constitute a three-tiered waterproofing section.

As described above, between the fixation position at which the front end side of the tubular braided shielding member is fixed to the tubular part of the shield shell by crimping with the first crimp ring, and the fixation position at which the front end side of the grommet is fixed to the tubular part of the shield shell by crimping with the second crimp ring, the annular sealing rib protrudes from the inner periphery of the grommet, and the recess into which the annular sealing rib is press-fit is provided on the outer periphery of the tubular part of the shield shell. According to the configuration, since the annular sealing rib provided on the inner periphery of the grommet is not located beneath the second crimp ring, it is possible to suppress the pressing force applied by the second crimp ring from directly acting on the annular sealing rib, thus preventing the thermal deformation of the annular sealing rib even when the grommet is exposed to a high temperature condition for a long period of time. Also, the annular sealing rib is provided in a protruding manner between the fixation position with the first crimp ring and the fixation position with the second crimp ring, more specifically, at a position close to the fixation position with the second crimp ring that applies the pressing force, and is configured to be press-fit into the recess provided on the tubular part of the shield shell, in order to increase the contact area between the annular sealing rib and the tubular part, thus making it possible to enhance the tight contact between the annular sealing rib and the tubular part of the shield shell, and to prevent the positional displacement of the grommet in the axis direction of the tubular part. Further, the tight contact between the outer periphery of the first crimp ring and the inner periphery of the grommet is also enhanced by the annular sealing rib being tightly fit in the recess of the tubular part of the shield shell.

Therefore, according to the above-described configuration, it is possible to reliably waterproof the wire harness terminal without deteriorating the sealing performance of the grommet, even when the grommet is exposed to a high temperature condition for a long period of time.

It is preferable that the outer surfaces on both sides of the annular sealing rib provided on the grommet be in contact with the inner surfaces on both sides of the recess, and one or more lips protrude from a projecting end face of the annular sealing rib, the lips being pressed against the bottom of the recess.

As described above, by providing one or more lips in a protruding manner from the projecting end face of the annular sealing rib that is not located beneath the second crimp ring, it is possible for the lips to be pressed against the bottom of the recess without thermally deforming, allowing a further improvement in the sealing performance of the grommet.

Further, it is preferable that, between the recess and the fixation position with the first crimp ring, a small annular rib that is pressed against the inner periphery of the grommet be provided on the outer periphery of the tubular part of the shield shell. According to the configuration, it is possible to further improve the tight contact between the tubular part of the shield shell and the grommet.

It is preferable that the other end of the grommet be overlaid on a front end of a corrugated tube or a metal pipe through which the wire harness is inserted, and be fixed by winding a tape, fastened by a fastening band, or fixed by crimping with a crimp ring.

Advantageous Effects

As described above, an annular sealing rib protrudes from the inner periphery of a grommet between a fixation position at which a front end side of a tubular braided shielding member is fixed to a tubular part of a shield shell by crimping with a first crimp ring, and a fixation position at which a front end side of a grommet is fixed to the tubular part of the shield shell by crimping with a second crimp ring, and a recess into which the annular sealing rib is press-fit is provided at the corresponding position on the outer periphery of the tubular part of the shield shell. Because the annular sealing rib provided on the inner periphery of the grommet is not located beneath the second crimp ring, it is possible to suppress the pressing force applied by the second crimp ring from directly acting on the annular sealing rib. This prevents the thermal deformation of the annular sealing rib even when the grommet is exposed to a high temperature condition for a long period of time. Also, the annular sealing rib protrudes from a position close to the fixation position with the second crimp ring, and is configured to be press-fit into the recess provided on the tubular part of the shield shell in order to increase the contact area between the annular sealing rib and the tubular part. This makes it possible to enhance the tight contact between the annular sealing rib and the tubular part of the shield shell, and to prevent the positional displacement of the grommet in the axis direction of the tubular part. Therefore, it is possible to reliably waterproof the wire harness terminal without deteriorating the sealing performance of the grommet, even when the grommet is exposed to a high temperature condition for a long period of time.

Also, by providing one or more lips in a protruding manner from the projecting end face of the annular sealing rib, it is possible for the lips to be pressed against the bottom of the recess without thermally deforming, allowing a further improvement in the sealing performance of the grommet.

BRIEF DESCRIPTION OF THE DRAWINGS

FIG. 1 illustrates a terminal waterproofing structure for a wire harness according to the present embodiment, and in particular.

FIG. 3 illustrates an example, and in particular.

DETAILED DESCRIPTION OF THE EMBODIMENTS

Hereinafter, an embodiment will be described with reference to the drawings.

Figure 1A:
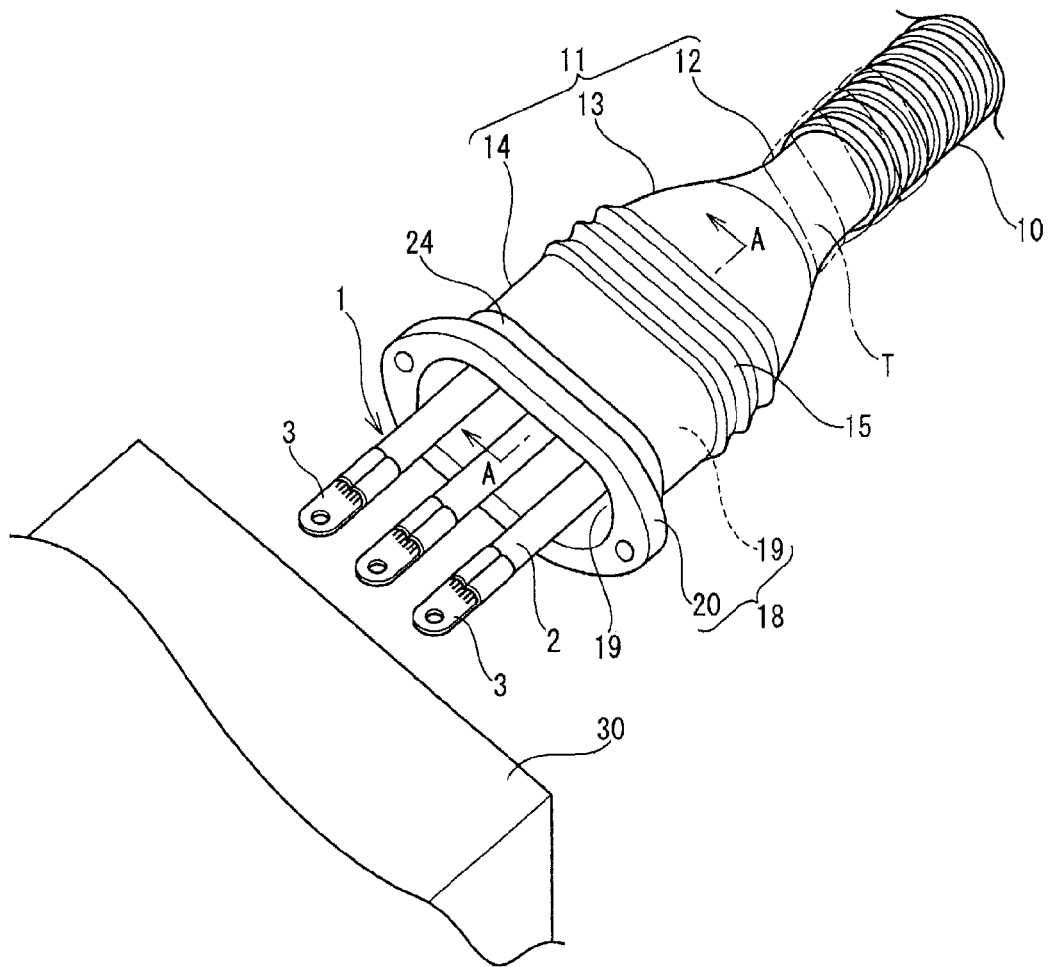
FIG. 1(A) is a perspective view illustrating a terminal portion of the wire harness to be connected to a connection counterpart device.
Figure 1B:
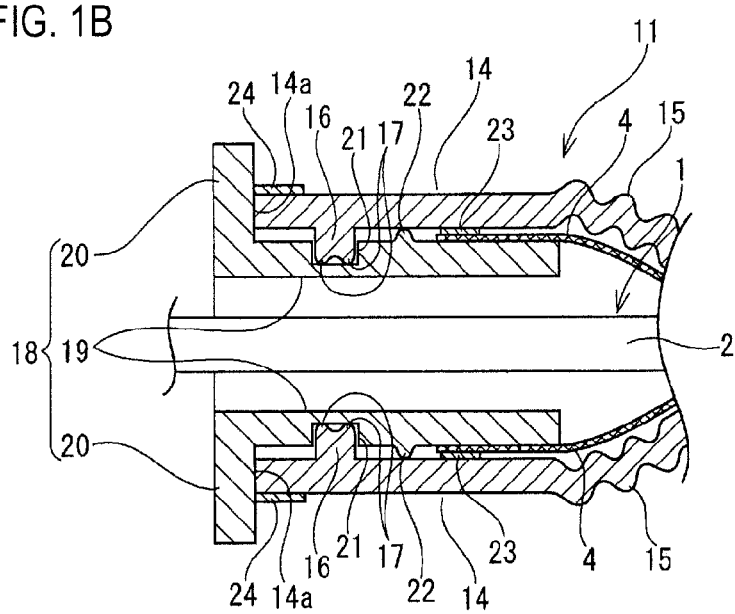
FIG. 1(B) is a cross-sectional view taken along the line A-A.
Figure 2:
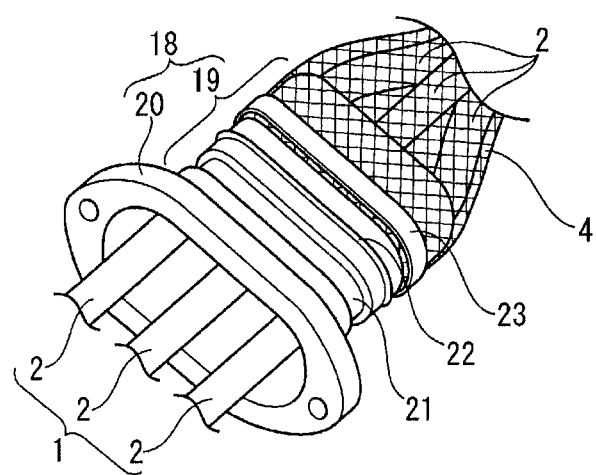
FIG. 2 is a perspective view illustrating a state in which a front end side of a tubular braided shielding member is overlaid on a tubular part of a shield shell, and is fixed by crimping with a first crimp ring.
Figure 3A:
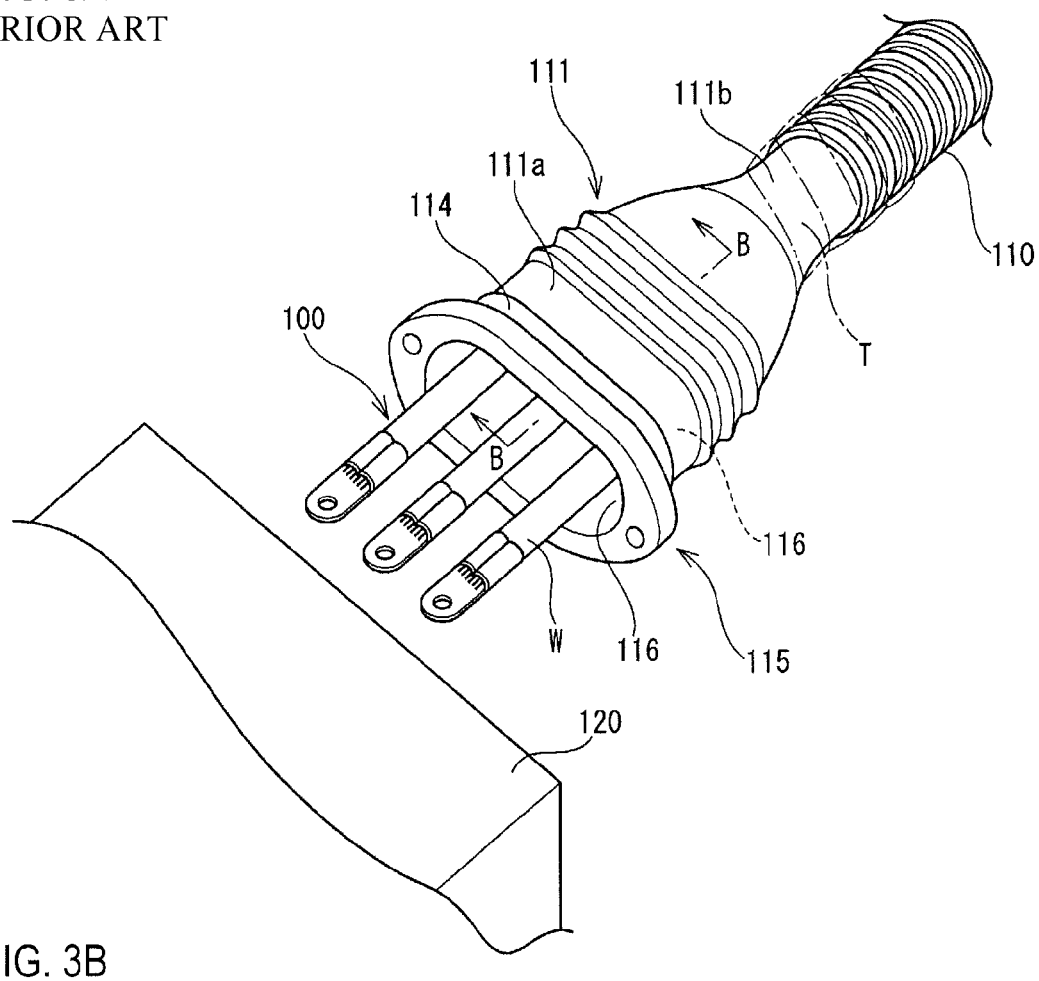
FIG. 3(A) is a perspective view illustrating a terminal portion of a wire harness to be connected to a connection counterpart device.
Figure 3B:
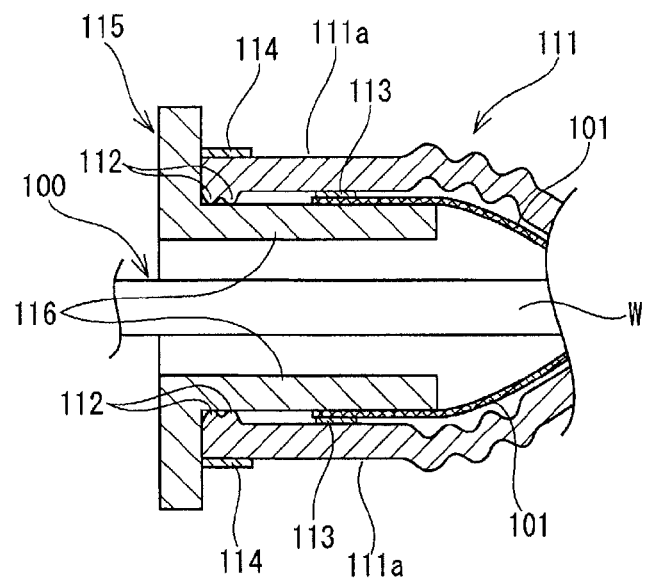
FIG. 3(B) is a cross-sectional view taken along the line B-B.

FIGS. 1(A), 1(B), and 2 illustrate the embodiment.

In the present embodiment, a wire harness 1 constituted by three insulated coated electric wires 2 is routed between an inverter and a battery of a hybrid car (not shown), and the wire harness 1 is inserted into a metal pipe (not shown) made from aluminium type metal in an underfloor wiring region (not shown) of the vehicle body.

In each of both end regions of the wire harness 1 in which the wire harness 1 is drawn from the underfloor wiring region into an engine compartment in the front portion of the vehicle or a vehicle interior (not shown) in the rear portion of the vehicle, and is connected to an inverter or a battery serving as a connection counterpart device 30, the wire harness 1 drawn from an open terminal of the metal pipe is first inserted into a corrugated tube 10 connected to the terminal of the metal pipe, then a terminal section of the wire harness 1 is drawn from an open terminal of the corrugated tube 10, and terminals 3 that are crimped to terminals of the electric wires 2 are electrically connected to terminals (not shown) of the connection counterpart device 30. A grommet 11 for protection from water is attached to the terminal section of the wire harness 1 drawn from the open terminal of the corrugated tube 10, as shown in FIGS. 1(A) and (B).

The grommet 11 is tubular and made from a molded article made from rubber or elastomer (EPDM in the present embodiment). A small diameter tubular part 12 on one end of the grommet 11 and a large diameter tubular part 14 on the other end of the grommet 11 are formed continuously via an enlarging diameter tubular part 13. The small diameter tubular part 12 of the grommet 11 is coupled to the terminal of the corrugated tube 10, sealing the terminal, whereas the large diameter tubular part 14 of the grommet 11 is coupled to a case of the connection counterpart device 30 via a shield shell 18 made from metal, sealing the case. Also, the grommet 11 of the present embodiment includes an accordion section 15 in the region between the rear end of the large diameter tubular part 14 and the front end of the enlarging diameter tubular part 13, the accordion section 15 giving flexibility to the grommet 11.

The shield shell 18 is constituted by a tubular part 19, whose cross section has an ellipsoidal shape and on which the large diameter tubular part 14 of the grommet 11 is externally fitted and is fixed, and a flange part 20 that projects in the radial direction from the front end of the tubular part 19, the flange part 20 having a structure that allows it to be fastened by a bolt to the case of the connection counterpart device 30. As shown in FIGS. 1(B) and 2, the front end side of the tubular braided shielding member 4 (hereinafter, referred to as "braided shield 4") covering the wire harness 1 is overlaid on the tubular part 19 of the shield shell 18, and is fixed by crimping with a first crimp ring 23. Also, the large diameter tubular part 14 of the grommet 11, which covers the fixation position with the first crimp ring 23 and is externally fitted to the tubular part 19 that projects beyond a front end of the braided shield 4, has a front end 14a that abuts on the flange part 20 of the shield shell 18, and the outer periphery of the large diameter tubular part 14 is fixed on the front end side by crimping with a second crimp ring 24.

Also, as shown in FIG. 1(B), between the fixation position with the second crimp ring 24 and the fixation position with the first crimp ring 23, an annular sealing rib 16, whose cross-section is rectangular, protrudes from the inner periphery of the large diameter tubular part 14 of the grommet 11 and a recess 21, into which the annular sealing rib 16 is press-fit, is provided on the outer periphery of the tubular part 19 of the shield shell 18. A plurality (two in the present embodiment) of lips 17 protrude from the projecting end face of the annular sealing rib 16. The outer surfaces on both sides of the annular sealing rib 16 are in contact with the inner surfaces on both sides of the recess 21, and the lips 17 of the annular sealing rib 16 are pressed against the bottom of the recess 21.

Further, a small annular rib 22, which is pressed against the inner periphery of the large diameter tubular part 14 of the grommet 11, is provided on the outer periphery of the tubular part 19 of the shield shell 18 between the recess 21 and the fixation position with the first crimp ring 23.

As shown in FIG. 2, in order to fit the grommet 11 on a terminal of the wire harness 1, the front end side of the braided shield 4 covering the wire harness 1 is first overlaid at a predetermined position on the tubular part 19 of the shield shell 18, and is fixed by crimping with the first crimp ring 23. Subsequently, the large diameter tubular part 14 of the grommet 11 is externally fitted to the tubular part 19 that projects beyond a front end of the braided shield 4 while covering the fixation position with the first crimp ring 23. The front end 14a of the large diameter tubular part 14 abuts on the flange part 20 of the shield shell 18, and the large diameter tubular part 14 is fixed on the front end side by crimping with the second crimp ring 24, on the other hand, the small diameter tubular part 12 on the other end of the grommet 11 is externally fitted to the end section of the corrugated tube 10 and is tightly fixed by winding a tape (T). At that time, the annular sealing rib 16 on the inner periphery of the large diameter tubular part 14 of the grommet 11 is press-fit into the recess 21 on the outer periphery of the tubular part 19 of the shield shell 18, and the outer surfaces on both sides of the annular sealing rib 16 are brought into contact with the inner surfaces on both sides of the recess 21 and the lips 17 of the annular sealing rib 16 are pressed against the bottom of the recess 21. Also, the small annular rib 22 on the outer periphery of the tubular part 19 of the shield shell 18 is pressed against the inner periphery of the large diameter tubular part 14 of the grommet 11. By connecting the terminals 3 of the electric wires 2 of the wire harness 1 to terminals of the connection counterpart device 30, and mounting the flange part 20 of the shield shell 18 on whose tubular part 19 the grommet 11 is externally fitted in a manner as described above on the case of the connection counterpart device 30 by bolt fastening, attaching of the grommet 11 to the terminal of the wire harness 1 is completed.

As described above, in the present embodiment, the annular sealing rib 16 protrudes from the inner periphery of the large diameter tubular part 14 of the grommet 11 between the fixation position with the first crimp ring 23 and the fixation position with the second crimp ring 24. The recess 21, into which the annular sealing rib 16 is press-fit, is provided at the corresponding position on the outer periphery of the tubular part 19 of the shield shell 18. The annular sealing rib 16 is not located beneath the second crimp ring 24, and it is thus possible to suppress the pressing force applied by the second crimp ring 24 from directly acting on the annular sealing rib 16, thereby preventing the thermal deformation of the annular sealing rib 16 even when the grommet 11 is exposed to a high temperature condition for a long period of time. Because the annular sealing rib 16 protrudes at a position close to the fixation position with the second crimp ring 24—and is configured to be press-fit into the recess 21 provided on the tubular part 19 of the shield shell 18 in order to increase the contact area between the annular sealing rib and the tubular part 19—the tight contact between the annular sealing rib 16 and the tubular part 19 of the shield shell 18 can be enhanced, which prevents the positional displacement of the grommet 11 in the axis direction of the tubular part. Therefore, it is possible to reliably waterproof the terminal of the wire harness 1 without deteriorating the sealing performance of the grommet 11 even when the grommet 11 is exposed to a high temperature condition for a long period of time.

Also, by providing a plurality of lips 17 on the projecting end face of the annular sealing rib 16, it is possible to press the lips against the bottom of the recess 21 without thermally deforming, allowing a further improvement in the sealing performance of the grommet 11.

Furthermore, by providing the small annular rib 22 on the outer periphery of the tubular part 19 of the shield shell 18 between the recess 21 and the fixation position with the first crimp ring 23—and the small annular rib 22 being pressed against the inner periphery of the large diameter tubular part 14 of the grommet 11—it is possible to further enhance the tight contact between the tubular part 19 of the shield shell 18 and the large diameter tubular part 14 of the grommet 11.

Because the annular sealing rib 16 is tightly fitted into the recess 21—and the small annular rib 22 is pressed against the inner periphery of the large diameter tubular part 14 of the grommet 1—the tight contact between the outer periphery of the first crimp ring 23 and the inner periphery of the large diameter tubular part 14 of the grommet 11 can be improved.

As described above, according to the present embodiment, it is possible to reliably waterproof a terminal of the wire harness 1 by the fixation by crimping with the second crimp ring, the tight-fitting of the annular sealing rib 16 including the lips 17 into the recess 21, the small annular rib 22 being pressed against the inner periphery of the large diameter tubular part 14, the adhesion between the outer periphery of the first crimp ring 23 and the inner periphery of the large diameter tubular part.

Note that, in the present embodiment, the small diameter tubular part 12 of the grommet 11 is externally fitted to a terminal of the corrugated tube 10 connected to the metal pipe and is fixed. But a configuration is also possible in which the small diameter tubular part 12 of the grommet 11 is externally fitted to a terminal of the metal pipe, and is fixed by a fastening band or a crimp ring.

The invention claimed is:

1. A terminal waterproofing structure for a wire harness to be routed in an electric car or a hybrid car, the wire harness being constituted by a plurality of high-voltage electrical power lines, the terminal waterproofing structure comprising:
   a front end side of a tubular braided shielding member covering the wire harness overlaid on a tubular part of a shield shell and fixed by crimping with a first crimp ring, the shield shell having a flange part protruding from a front end side of the tubular part;
   a tubular grommet made from an elastic member externally fitted to the tubular part of the shield shell that projects beyond the front end side of the tubular braided shielding member while covering a portion of the tubular braided shielding member fixed by crimping;
   a front end of the grommet abutting on the flange part of the shield shell, and an outer periphery of the grommet on the front end fixed by crimping with a second crimp ring;
   a recess provided on an outer periphery of the tubular part of the shield shell; and
   an annular sealing rib disposed between a fixation position with the second crimp ring and a fixation position with the first crimp ring, the annular sealing rib protruding from an inner periphery of the grommet and being press-fit into the recess, wherein
   the second crimp ring, the annular sealing rib, and the first crimp ring constitute a three-tiered waterproofing section,
   outer surfaces on both sides of the annular sealing rib provided on the grommet are in contact with inner surfaces on both sides of the recess, and
   one or more lips protrude from a projecting end face of the annular sealing rib, the lips being pressed against a bottom of the recess.

2. The terminal waterproofing structure according to claim 1, wherein, between the recess and the fixation position with the first crimp ring, a small annular rib that is pressed against the inner periphery of the grommet is provided on the outer periphery of the tubular part of the shield shell.

3. The terminal waterproofing structure according to claim 1, wherein another end of the grommet is overlaid on a front end of a corrugated tube or a metal pipe through which the wire harness is inserted, and is fixed by winding a tape, fastened by a fastening band, or fixed by crimping with a crimp ring.

4. The terminal waterproofing structure according to claim 1, wherein, between the recess and the fixation position with the first crimp ring, a small annular rib that is pressed against the inner periphery of the grommet is provided on the outer periphery of the tubular part of the shield shell.

* * * * *